(12) United States Patent
Kanamori

(10) Patent No.: US 8,670,135 B2
(45) Date of Patent: Mar. 11, 2014

(54) INFORMATION PROCESSING APPARATUS AND CONTROL METHOD WHEN INSTALLING A PRINTER DRIVER

(75) Inventor: Hideyuki Kanamori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 13/364,136

(22) Filed: Feb. 1, 2012

(65) Prior Publication Data

US 2012/0200877 A1    Aug. 9, 2012

(30) Foreign Application Priority Data

Feb. 7, 2011    (JP) .................................. 2011-023490

(51) Int. Cl.
*G06F 3/12* (2006.01)

(52) U.S. Cl.
USPC ........................................ 358/1.13; 358/1.15

(58) Field of Classification Search
USPC .............................................. 358/1.13, 1.15
See application file for complete search history.

(56) References Cited

U.S. PATENT DOCUMENTS

| 2006/0044586 A1* | 3/2006 | Kujirai et al. ............... 358/1.13 |
| 2011/0075177 A1* | 3/2011 | Takagi ......................... 358/1.13 |
| 2011/0075205 A1* | 3/2011 | Oomura ....................... 358/1.15 |
| 2011/0075207 A1* | 3/2011 | Nakata ......................... 358/1.15 |

FOREIGN PATENT DOCUMENTS

JP    2009-099027 A    5/2009

* cited by examiner

*Primary Examiner* — Qian Yang
(74) *Attorney, Agent, or Firm* — Canon USA Inc. IP Division

(57) ABSTRACT

An installer of the driver B according to the present invention searches a print queue of the driver A corresponding to a printer controlled by the install target driver B, determines whether an output destination of the searched print queue is a remote printer, and if it is determined that the output destination of the print queue is the remote printer, ends install processing without making an update request for the print queue to the operating system.

13 Claims, 12 Drawing Sheets

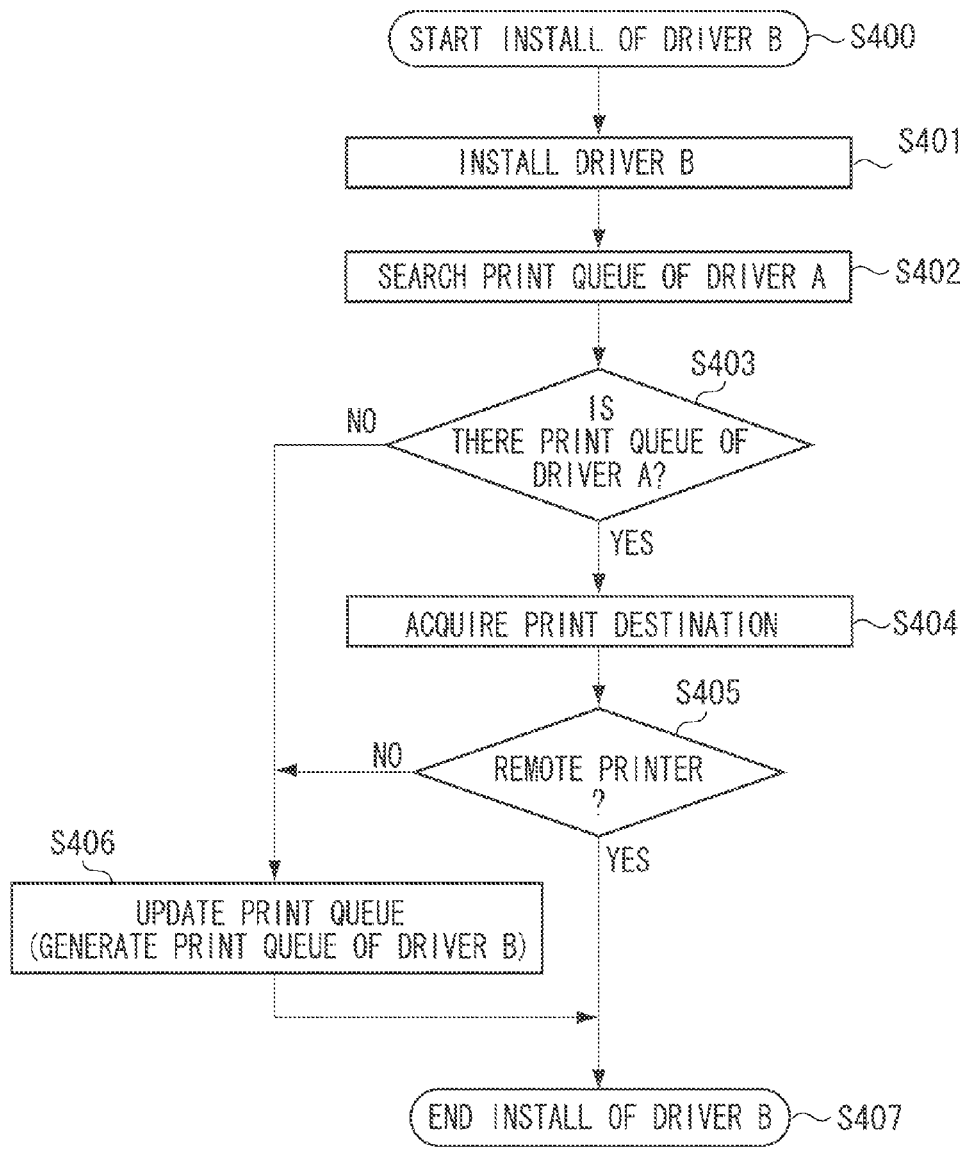

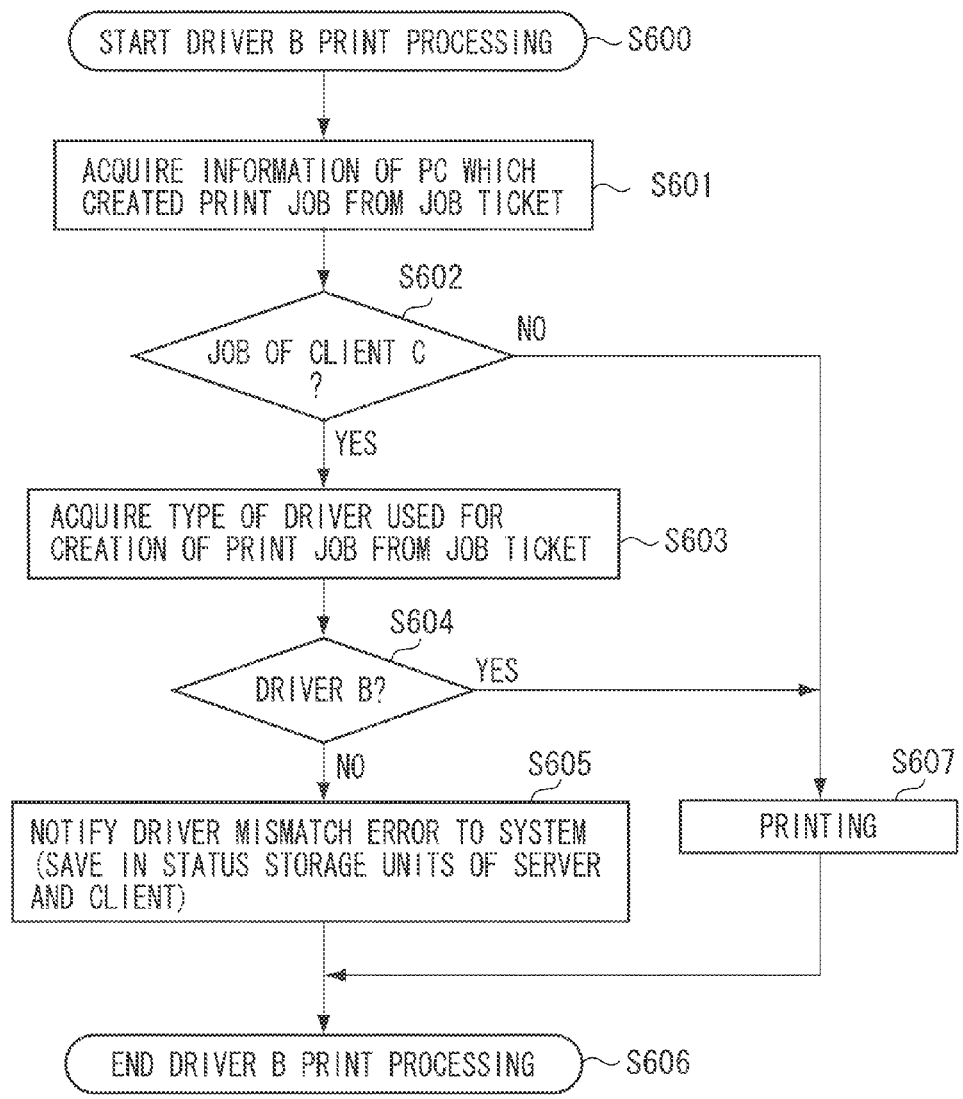

INFORMATION PROCESSING APPARATUS AND CONTROL METHOD WHEN INSTALLING A PRINTER DRIVER

BACKGROUND OF THE INVENTION

1. Field of the Invention

The present invention relates to control when a printer driver is installed on a computer.

2. Description of the Related Art

Conventionally, in a print system composed of a host computer and a printer, there is a computer in which a plurality of types of printer drivers are operable for the same printer. Japanese Patent Application Laid-Open No. 2009-099027 discusses a technique for installing a plurality of types of printer drivers for the same printer. Usually, although a plurality of types of printer drivers can be installed on the host computer, only one printer driver is generally used for the same printer.

When the printer driver is installed on the host computer, a print queue for processing sequentially print jobs by using the printer driver is generated by an operating system (OS). If there is already a print queue which uses different types of printer drivers in one printer, the existing print queue is updated to a print queue which uses the printer driver according to a predetermined priority by the OS.

However, in a server/client type print system in which a printer connected to the host computer is usable from other computers as a shared printer, a printer driver which is compatible between both a server and a client needs to be operating.

A printer driver on the server side generates output data based on print data which is sent from the client and various types of print setting values which have been set by a printer driver on the client side, and transmits the output data to the printer.

Hence, when a printer driver to be operated is changed by installing a different type of printer driver which is not compatible with existing printer driver on either the server or the client, there is a problem that the printer driver of the server becomes unable to interpret various types of print setting values which are sent from the client, and becomes unable to perform printing from the client.

SUMMARY OF THE INVENTION

The present invention is to provide a system, in a case where a print queue of a printing apparatus is updated while plural types of printer drivers which correspond to the printing apparatus are installed, for appropriately installing a printer driver on an information processing apparatus in which an operating system updates a print queue with priority given to either type of printer driver and appropriately operating the printer driver.

According to an aspect of the present invention, an operating system runs on an information processing apparatus, wherein the operating system, in a case where a print queue of a printing apparatus is updated while plural types of printer drivers corresponding to the same printing apparatus are installed, updates the print queue giving priority to either type of printer driver. The information processing apparatus includes a search unit configured to search an existing print queue corresponding to a printer controlled by an install target printer driver, in install processing of the printer driver, a determination unit configured to determine whether an output destination of the print queue searched by the search unit is a printing apparatus connected via another apparatus, and a control unit configured, if it is determined that the output destination of the print queue is the printing apparatus connected via another apparatus by the determination unit, to perform control to end the install processing without making an update request for the print queue to the operating system.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a flowchart illustrating install processing of an installer of a driver in a second exemplary embodiment.

FIG. 10 is a flowchart illustrating print processing of a driver which is operated on a server PC.

DESCRIPTION OF THE EMBODIMENTS

Various exemplary embodiments, features, and aspects of the invention will be described in detail below with reference to the drawings.

It should be noted that exemplary embodiments described hereinbelow are not intended to limit the present invention according to the scope of the claims, and all combinations of features described in the present exemplary embodiment are not necessarily essential for solutions of the present invention.

Figure 1:
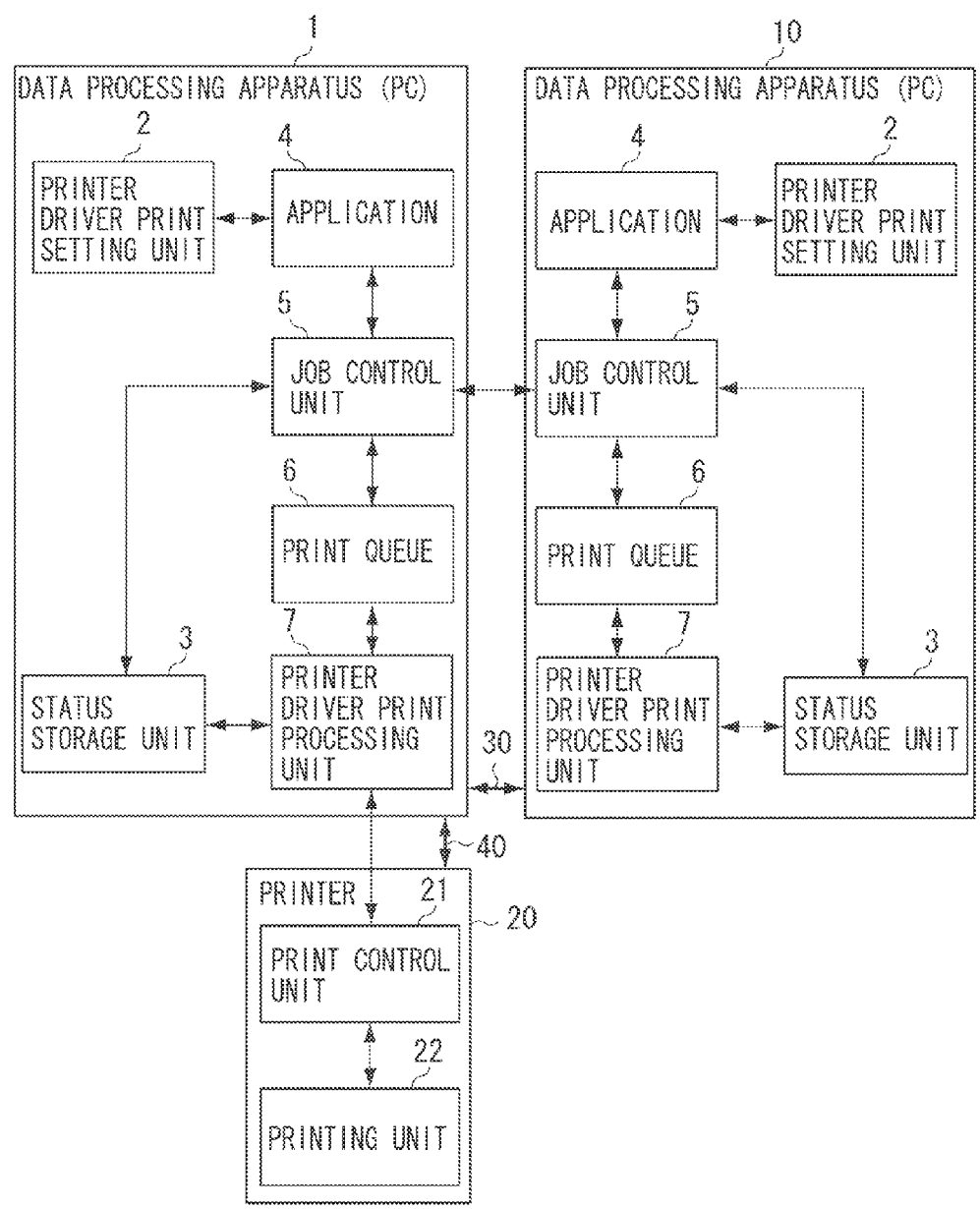
FIG. 1 is a block diagram illustrating an example of configuration of a print system according to the present exemplary embodiment.

FIG. 1 is a block diagram illustrating an example of configuration of a print system according to the first exemplary embodiment. In FIG. 1, data processing apparatuses 1 and 10 perform control of the printer. In this case, the data processing apparatuses 1 and 10 are personal computers (hereinafter, referred to as PCs). In the present exemplary embodiment, the PC 1 and the PC 10 will be described assuming that MacOS (registered trademark) X10.5 is run as an operating system (hereinafter, referred to as an OS), but the present exemplary embodiment is not limited to the OS. The OS, though not illustrated in FIG. 1, manages resources of the PCs, for example, blocks within the PCs. The PC 1 and the PC 10 have hardware configuration provided in general information processing apparatuses. Hereinbelow, hardware configuration of the PCs 1 and 10 will be described with reference to FIG. 2.

Figure 2:
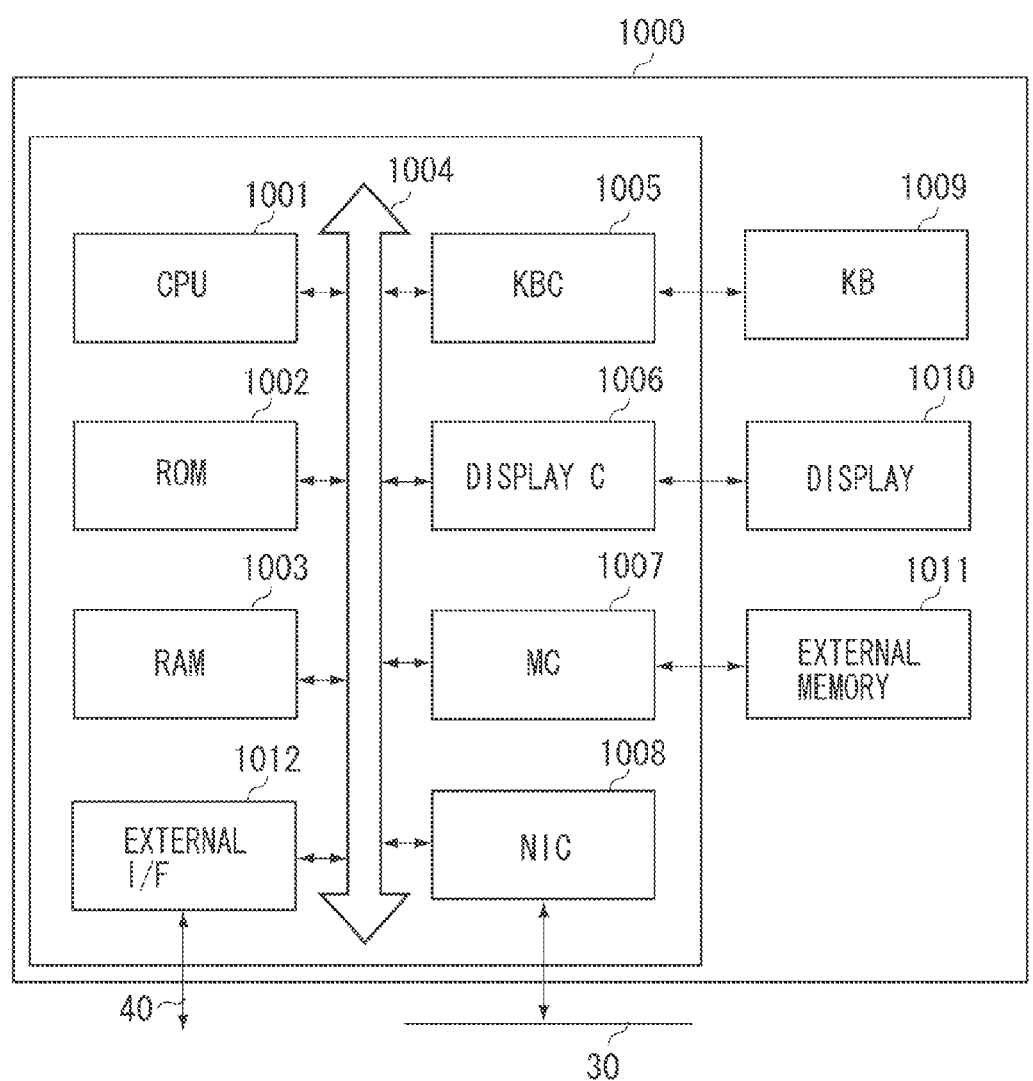
FIG. 2 is a block diagram illustrating an example of hardware configuration of a personal computer (PC).

FIG. 2 is a block diagram illustrating an example of hardware configuration of the PC 1 and the PC 10. In the descriptions of FIG. 2, the PC 1 and the PC 10 are written as an information processing apparatus 1000.

In the information processing apparatus 1000 illustrated in FIG. 2, a central processing unit (CPU) 1001 executes programs such as OSs or applications stored in a program ROM of a read-only memory (ROM) 1003, or loaded into a random-access memory (RAM) 1002 from an external memory 1011. Further, the RAM 1002 also acts as a main memory, a work area or the like of the CPU 1001.

A keyboard controller (KBC) 1005 controls an input from a keyboard (KB) 1009 or not-illustrated pointing device (e.g., a mouse or a touch pad). A display controller (display C) 1006 controls display of a display 1010. The display 1010 may be a cathode ray tube (CRT) or may be a different type of display device such as a liquid crystal display (LCD). Further, the display 1010 may be a touch panel type display.

A memory controller (MC) 1007 controls an access to the external memory 1011 such as a hard disk drive (HDD) or a solid-state drive (SSD). A network interface card (NIC) 1008 controls communication with other apparatuses, via a network (communication interface 30). An external interface (external I/F) 1012 controls wired or wireless communications with other apparatuses. The external I/F 1012 is, for example, a universal serial bus (USB) interface.

Hereinbelow, returning to descriptions of FIG. 1, the PC 1 will be described below, but configuration of the PC 10 is also similar to that of the PC 1. The PC 1 includes a status storage unit 3, an application 4, a job control unit 5, and a print queue 6. A printer driver print setting unit 2 (hereinafter, referred to as a print setting unit), and a printer driver print processing unit 7 (hereinafter, referred to as a print processing unit 7) are saved (generated) on the PC 1, when a printer driver is installed on the PC 1. The print setting unit 2 and the print processing unit 7 control printing in synchronization with the application or the print queue under control of the OS. The printer driver includes the print setting unit 2 and the print processing unit 7.

A communication interface 30 is assumed to be a local area network (LAN) such as Ethernet (registered trademark). The PC 1 can exchange data with the PC 10 having similar configuration via the communication interface 30. A communication interface 40 is assumed to be a universal serial bus (USB), but it is not limited to the USB, and other communication interfaces (e.g., small computer system interface (SCSI), LAN) may be used. The PC 1 is connected to a printer 20 via the communication interface 40.

The printer 20 includes a print control unit 21, and a printing unit 22. In the present exemplary embodiment, an inkjet printer is assumed as the printer 20, but it is not limited to this. A laser printer, a facsimile, a copying machine, or their multifunction peripheral may be used.

A user creates data (e.g., a document) which should be printed by the application 4. Then, when the user performs various types of print settings on a print dialog (not illustrated) by using the print setting unit 2, the print setting unit 2 stores the various types of print settings in a job ticket created by the application 4. Furthermore, when the user performs operation to make a request for printing (when clicking a "print" button arranged on the print dialog), the print setting unit 2 returns control to the OS, and the OS delivers the control to the application 4. The application 4 creates a print job including print data and the job ticket in which the above-described various types of print setting information is stored, and sends them to the job control unit 5.

The job control unit 5, upon receiving a print job, sends the print job to the print processing unit 7 through a print queue. The print processing unit 7 converts the print data into output data based on various types of print setting information retained in the received job ticket, and transmits the output data to the printer 20.

In the MacOS X10.5, not only a local print as described above, but also a remote print for sharing the print queue 6 of the PC 1 with the PC 10, and processing on the side of the PC 1 the print job created by the PC 10 is also possible.

Upon creating a print job by an application 4 and a print setting unit 2 of the PC 10, a job control unit 5 of the PC 10 sends the received print job to the job control unit 5 of the PC 1. The job control unit 5 of the PC 1, upon receiving a print job from the PC 10, sends the print job to the print processing unit 7 of the PC 1 through the print queue 6 of the PC 1. The print processing unit 7 of the PC 1 converts print data into output data, based on various types of print setting information retained in a job ticket of the received print job, and transmits it to the printer 20.

In such a remote print, the print setting unit 2 which works on the PC 10 and the print processing unit 7 which works on the PC 1 perform print processing in synchronization with each other. In the MacOS X10.5 assumed in the present exemplary embodiment, a printer driver operable on an OS of the MacOS X10.4 or before (hereinafter, referred to as a driver A), and a printer driver operable on an OS of the MacOS X10.6 or later (hereinafter, referred to as a driver B) are usable. In the present exemplary embodiment, the driver A is assumed as a printer driver for Tioga, and the driver B is assumed as a printer driver for Common Unix (registered trademark) Print System (CUPS) respectively. The driver A and the driver B are printer drivers of types which are incompatible with each other. Further, the driver B is a printer driver of a type which is given priority, in the MacOS X10.5.

In a case where both printer drivers of the driver A and the driver B as printer drivers of the printer 20 are installed on a PC which operates on the MacOS X10.5, the driver B operable on the MacOS X10.6 or later is used preferentially, in the PC. Here, a case will be described where the driver B is going to be installed on the PC where the driver A is installed and a print queue using the driver A is generated. When update of the print queue for the printer 20 is requested by an installer of the driver B, the OS updates the print queue for the printer 20 giving the driver B priority over the driver A. In other words, the OS updates the print queue of the printer 20 which is using the driver A, to the print queue of the printer 20 which uses the driver B. However, the driver A and the driver B are incompatible with each other. For this reason, when the driver B is installed on either a server or a client which operates using the driver A, and as described above, a print queue of the printer 20 using the driver A is updated to a print queue of the printer 20 using the driver B, the printer driver of the server cannot interpret various types of print setting values which are sent from the client, and cannot perform printing instructed by the client.

Hereinafter, descriptions will be given in detail of processing of the present exemplary embodiment for installing the driver B on the server PC 1 or the client PC 10, in the server/client type print system in which the driver A has been installed on both the PC 1 and the PC 10, and a print queue which uses the driver A has been generated.

Hereinbelow, when a configuration common to the PC 1 and the PC 10 is described, it is simply referred to as PC. FIG.

3 illustrates an example of operation screen of an installer of the driver B. Install processing is performed by using the installer including the driver B and its install program, and when the installer on the PC is activated, an install operation screen 50 is displayed on the display 1010 of the PC.

When a close button 51 is pressed, the CPU 1001 of the PC ends operation of the installer after closing the screen 50. When an install button 52 is pressed, the CPU 1001 of the PC starts install processing of the driver B (FIG. 4).

Figure 4:
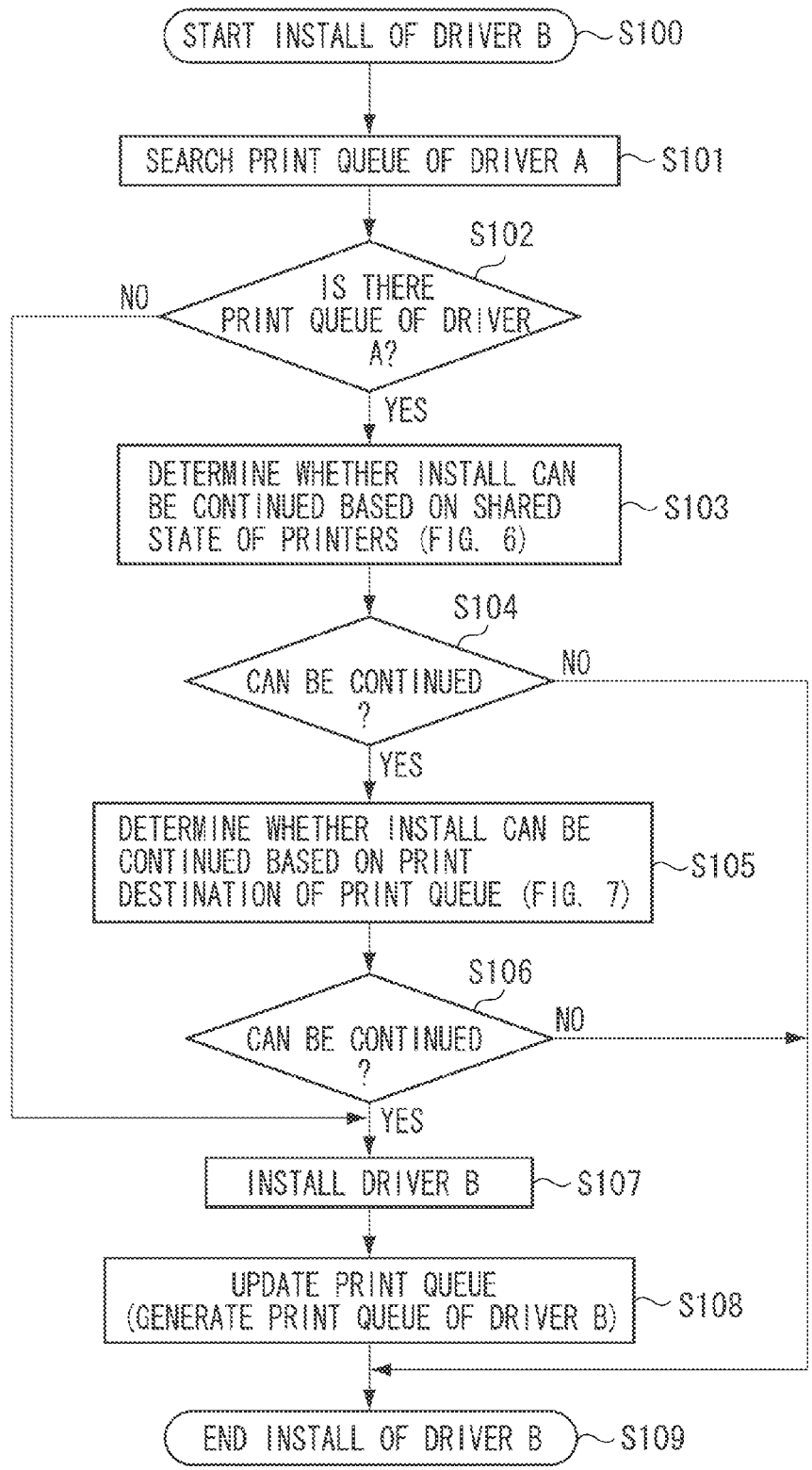
FIG. 4 is a flowchart illustrating an example of install processing of an installer of driver in a first exemplary embodiment.

FIG. 4 is a flowchart illustrating an example of install processing of the installer of the driver B in the first exemplary embodiment. This install processing is realized by causing the CPU 1001 of the PC to read out and execute an installer program which has been computer-readably recorded into the external memory 1011 or the like.

Figure 3:
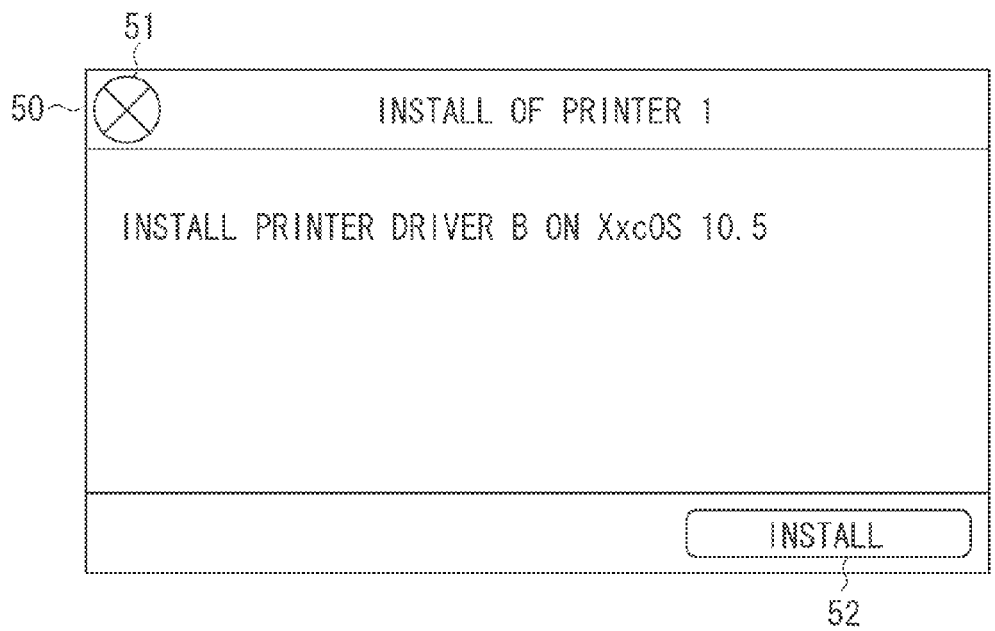
FIG. 3 illustrates an example of an operation screen of an installer of a driver.

In step S101, when the install button 52 in FIG. 3 is pressed, the CPU 1001 of the PC (hereinafter, simply referred to as CPU 1001) which executes the installer of the driver B, searches whether a print queue of the printer 20 which uses the driver A already exists on the PC. More specifically, the CPU 1001 searches existing print queue which uses an already installed printer driver (the driver A) of a type incompatible with the driver B. The driver A controls the same printer as a printer which is controlled by the driver B to be installed. Herein, the CPU 1001 refers to a postscript printer description (PPD) file to search the existing print queue. In the PPD file are stored various types of information of the printer and the printer driver, and the various types of information are managed in association with the print queues by the OS. The CPU 1001 can discriminate types of the printer drivers used by the respective print queues, by referring to this PPD file. The PPD file is stored in the external memory 1011 of the PC.

Next, in step S102, the CPU 1001 determines whether there is existing print queue of the printer 20 which uses the driver A. Then, if it is determined that there is not a print queue of the printer 20 which uses the driver A (NO in step S102), the CPU 1001 advances the processing to step S107 to install the driver B. In other words, the CPU 1001 stores a printer driver file of the driver B in the external memory 1011 of the PC. Furthermore, in step S108, the CPU 1001 requests the OS to update the print queue of the printer 20, and in step S109, ends the processing. In response to the update request of the print queue, the OS generates a print queue of the printer 20 which uses the driver B.

On the other hand, if it is determined that there is a print queue of the printer 20 which uses the driver A (YES in step S102), the CPU 1001 advances the processing to step S103. In step S103, the CPU 1001 checks shared state of the print queue of the printer 20 to determine whether install can be continued. The processing is performed to check whether, in a case where a PC of install destination is working as a server PC, there is any problem when the driver B is installed. The processing will be illustrated in detail in FIG. 6 described below.

Next, in step S104, the CPU 1001 determines the above-described check result in step S103. Then, if it is determined as "cannot be continued" (NO in step S104), in step S109, the CPU 1001 ends install processing as it is.

On the other hand, if it is determined as "can be continued" (YES in step S104), the CPU 1001 advances the processing to step S105. In step S105, the CPU 1001 checks for a print destination of the print queue of the printer 20 to determine whether install can be continued. The processing is performed to check whether, in a case where the PC of install destination is working as a client PC, there is any problem when the driver B is installed. The processing will be illustrated in detail in FIG. 7 described below.

Next, in step S106, the CPU 1001 determines the above-described check result in step S105. Then, if it is determined as "cannot be continued" (NO in step S106), in step S109, the CPU 1001 ends install processing as it is.

On the other hand, if it is determined as "can be continued" (YES in step S106), the CPU 1001 advances the processing to step S107 to install the driver B (stores a printer driver file of the driver B in the external memory 1011 of the PC). Furthermore, in step S108, the CPU 1001 requests the OS to update the print queue of the printer 20, then in step S109, ends the processing. In response to this update request for the print queue, the OS updates the print queue of the printer 20 which uses the driver A to a print queue of the printer 20 which uses the driver B.

As described above, in a case where install cannot be continued based on a shared state of the print queue which uses the driver A of the printer 20 or a print destination, an installer of the driver B controls to end install processing of the driver B, without making update request for the print queue of the printer 20 to the OS.

Figure 5:
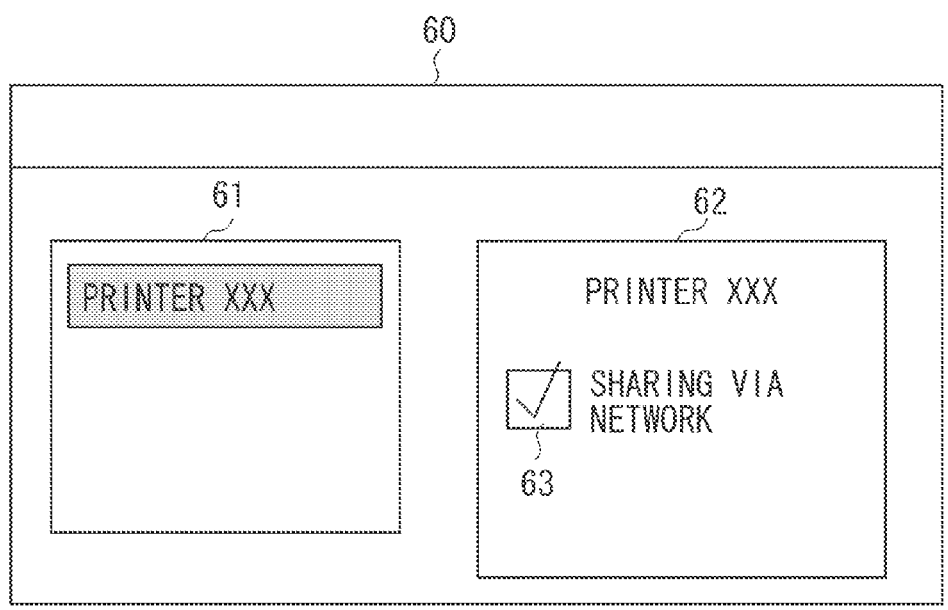
FIG. 5 illustrates a print queue list screen.

FIG. 5 illustrates a print queue list screen. The print queue lists screen 60 is displayed on the display 1010 by the CPU 1001 of the PC, when the user selects a display of print environment setting function of the OS, with a KB or a mouse or the like of the PC.

On a print queue list display portion 61 are displayed usable print queues. On a print queue operation portion 62 is displayed a shared setting check box 63 for operating shared setting of the print queue being selected on the print queue list display portion 61. The check box allows the user to set whether to share the print queue with another PC on a network. This setting is saved in the external memory 1011 of the PC.

Figure 6:
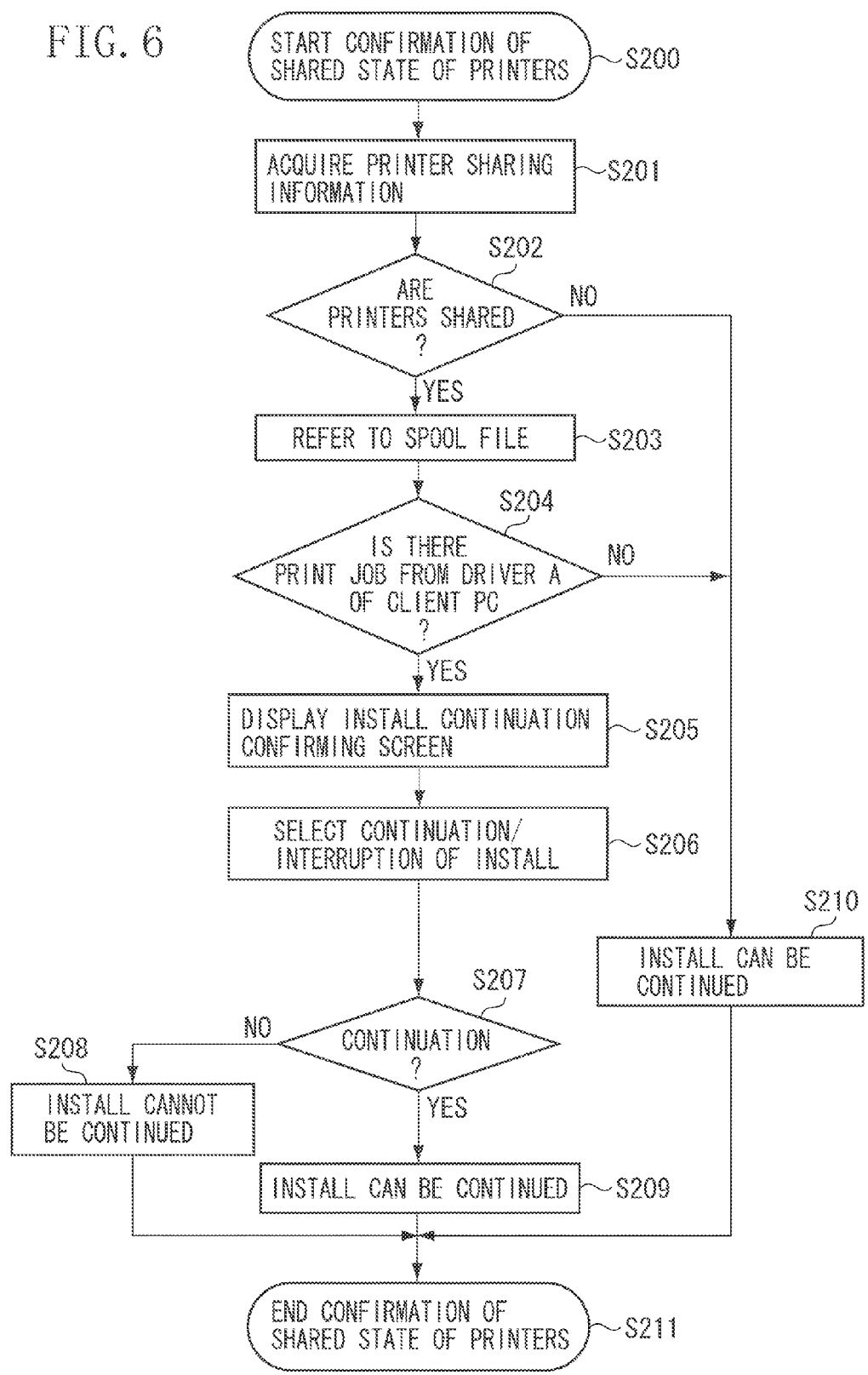
FIG. 6 is a flowchart illustrating details of processing for checking shared state of a print queue to determine whether install can be continued in step S103 in FIG. 4.

FIG. 6 is a flowchart illustrating the details of processing for checking shared state of the print queue to determine whether install can be continued in step S103 in FIG. 4. The processing is realized by the CPU 1001 of the PC reading out and executing an installer program which has been computer-readably recorded in the external memory 1011 or the like.

In step S201, the CPU 1001 firstly acquires shared information of the print queue of the printer 20. In this case, the CPU 1001 acquires information indicating shared setting state of the print queue set in the print queue list screen 60 in FIG. 5, from the external memory 1011 of the PC.

Next, in step S202, the CPU 1001 determines shared state from the information indicating shared setting state of the print queue of the printer 20 acquired in the above-described step S201. Then, if it is determined that the print queue of the printer 20 is not in a shared state (NO in step S202), the CPU 1001 advances the processing to step S210 to set a check result to "can be continued", then in step S211, ends the processing and returns the processing to the flowchart in FIG. 4.

On the other hand, if it is determined that the print queue of the printer 20 is in a shared state (YES instep S202), the CPU 1001 determines that a PC of install destination is a server PC in the server/client type print system, and advances the processing to step S203.

In step S203, the CPU 1001 refers to a spool file generated during the past printing. In the spool file, information about PCs which created print jobs and drivers used for creation is contained. By referring to the spool file, actual printing status of a client PC can be checked. The spool file is stored in the external memory 1011 of the PC.

In the present exemplary embodiment, actual printing status is checked by referring to the spool file, but printing status may be checked by using another method. First, for example, a printer driver operating on the client stores information for discriminating a computer on which the printer driver itself is operating during creation of the print job, as job creation PC information in the job ticket. Then, the printer driver operating on the server acquires the job creation PC information from the job ticket when processing the print job, saves the information as a history, and refers to the history in the above-described step S203. In this manner, the printer driver operating on the server PC may check printing status of the client.

In step S204, the CPU 1001 determines a result of referring to the spool file. Then, upon determining that there is no spool file of print jobs created by using the driver A in another PC working as the client PC (NO in step S204), the CPU 1001 advances the processing to step S210. In step S210, the CPU 1001 sets a check result to "can be continued", then in step S211, ends the processing, and returns the processing to the flowchart in FIG. 4.

On the other hand, upon determining that there is a spool file of the print job created by using the driver A in another PC working as the client PC (YES in step S204), the CPU 1001 determines that the print queue of the printer 20 is working in a shared state with another apparatus, and advances the processing to step S205.

Figure 8A:
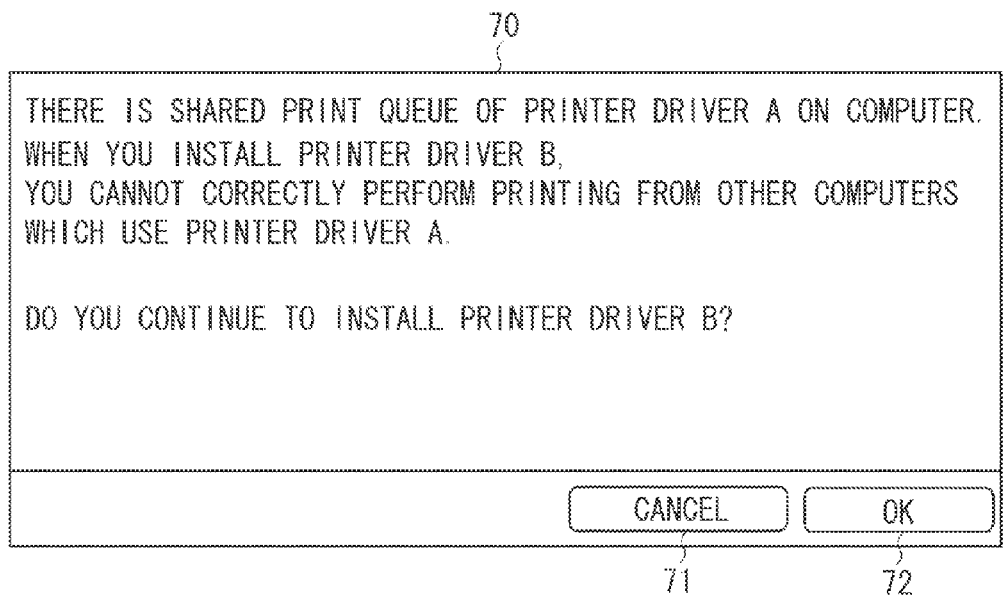
FIGS. 8A and 8B illustrate an example of an install continuation checking screen.

In step S205, the CPU 1001 displays an install continuation check screen 70 illustrated in FIG. 8A on the display 1010, and in step S206, accepts selection of continuation/interruption of install.

FIG. 8A illustrates an example of the install continuation check screen 70. When install is continued, an OK button 72 is pressed on the install continuation check screen 70. When install is interrupted, a cancel button 71 is pressed on the install continuation check screen 70.

Upon detecting selection of continuation/interruption of install on the install continuation check screen 70, in step S207, the CPU 1001 determines the selection of continuation/interruption of install. If the cancel button 71 has been pressed, the CPU 1001 determines the selection as interruption (not continued) (NO in step S207), then in step S208, sets a check result to "cannot be continued", in step S211, ends the processing, and returns the processing to the flowchart in FIG. 4.

On the other hand, when the OK button 72 has been pressed, the CPU 1001 determines the selection as continuation (YES in step S207), in step S209, sets a check result to "can be continued", then in step S211, ends the processing, and returns the processing to the flowchart in FIG. 4.

If it is determined that the print queue which uses the driver A of the printer 20 is in a shared state with another apparatus (YES in step S202), the CPU 1001 may be configured to directly advance the processing to step S208, and to determine that install cannot be continued.

Further, if it is determined that the print queue which uses the driver A of the printer 20 is working in a shared state with another apparatus (YES in step S204), the CPU 1001 may advance the processing as it is to step S208, and determine that install cannot be continued.

As described above, when the print queue which uses the driver A of the printer 20 is working in a shared state, the installer of the driver B performs control to end install processing of the driver B without making update request for the print queue of the printer 20 to the OS.

Figure 7:
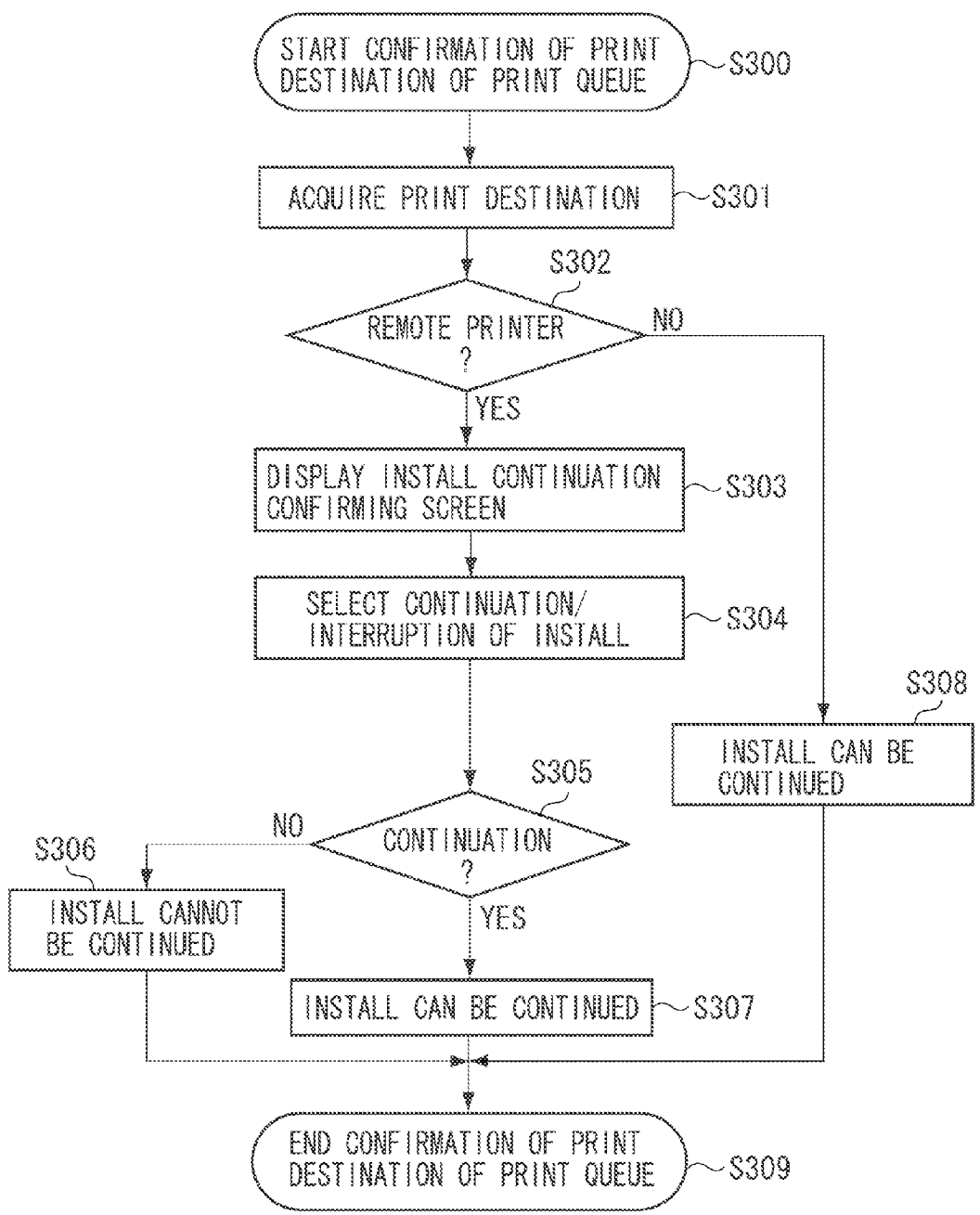
FIG. 7 is a flowchart illustrating details of processing for checking a print destination of a print queue to determine whether install can be continued in step S105 in FIG. 4.

FIG. 7 is a flowchart illustrating the details of processing for checking a print destination of the print queue to determine whether install can be continued in step S105 in FIG. 4.

The processing is realized by the CPU 1001 of the PC reading out and executing an installer program which has been computer-readably recorded in the external memory 1011 or the like.

In step S301, the CPU 1001 firstly acquires a print destination of the print queue of the printer 20. In this case, the CPU 1001 refers to a PPD file to acquire information about whether the print destination of the print queue of the printer 20 is a local printer or a remote printer. As described above, in the PPD file, various types of information of the printer and the printer driver is stored, and is managed by the OS in association with the print queues. The CPU 1001 can discriminate a print destination of the print queue, by referring to the PPD file.

Next, in step S302, the CPU 1001 determines whether the print destination acquired in the above-described step S301 is a remote printer. In other words, the CPU 1001 determines whether an output destination of the print queue using the installed driver A which controls the same printer as the the driver B is a printing apparatus (remote printer) connected via another apparatus. Then, if it is determined that the print destination is a local printer (not a remote printer) (NO in step S302), in step S308, the CPU 1001 sets a check result to "can be continued", in step S309, ends the processing, and returns the processing to flowchart in FIG. 4.

On the other hand, if it is determined that the print destination is a remote printer (YES in step S302), the CPU 1001 determines that the PC of install destination is a client PC in the server/client type print system, and advances the processing to step 303.

Figure 8B:
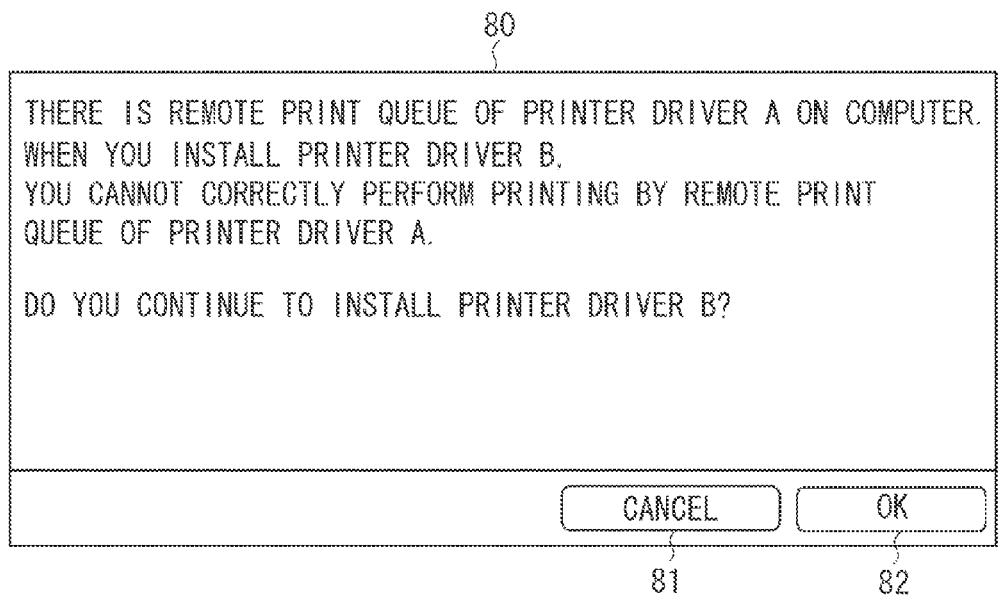

In step S30, the CPU 1001 displays an install continuation check screen 80 illustrated in FIG. 8B on the display 1010, and in step S304, accepts selection of continuation/interruption of install.

FIG. 8B illustrates an example of the install continuation check screen 80. When install is continued, an OK button 82 is pressed on the install continuation check screen 80. When install is interrupted, a cancel button 81 is pressed on the install continuation check screen 80.

Upon detecting selection of continuation/interruption of install on the install continuation check screen 80, in step S305, the CPU 1001 determines the selection of continuation/interruption of install. If the cancel button 81 has been pressed, the CPU 1001 determines the selection as interruption (not continued) (NO in step S305), in step S306, sets a check result to "cannot be continued", in step S309, ends the processing, and returns the processing to the flowchart in FIG. 4.

On the other hand, if the OK button 82 has been pressed, the CPU 1001 determines the selection as continuation (YES in step S305), in step S307, sets a check result to "can be continued", in step S309, ends the processing, and returns the processing to the flowchart in FIG. 4.

If it is determined that the print destination of the print queue which uses the driver A of the printer 20 is a remote printer (YES in step S302), the CPU 1001 may advance the processing as it is to step S306, and determine that install cannot be continued. As described above, when the print destination of the print queue which uses the driver A of the printer 20 is a remote printer, the installer of the driver B performs control to end install processing of the driver B without making update request for the print queue of the printer 20 to the OS.

As described hereinabove, according to the print system of the first exemplary embodiment, in a install processing of a printer driver, on a computer on which an operating system runs, especially on a computer which works as a server or a client, in a case where a print queue of the printing apparatus is updated while plural types of printer drivers corresponding to same printing apparatus are installed, the operating system updates the print queue giving priority to either type of printer driver. In this case, if remote printing cannot be correctly performed, the user can be notified accordingly, and the install processing can be ended without making update request for the print queue to the OS.

In the present exemplary embodiment, install processing of the driver B is ended without performing install of the driver B, and update request for the print queue is made to the OS, in a case where the print queue which uses the driver A is working in a shared state or the print destination is a remote printer. However, even in the above-described case, install of the driver B may be performed, and install processing of the driver B may be ended without making update request for the print queue to the OS.

Even in this configuration, when the print queue of the printing apparatus is updated while plural types of printer drivers which correspond to the same printing apparatus are installed, the printer driver can be appropriately installed on a computer on which the operating system runs (especially a computer which constitutes the server/client type print system). In this case the operating system updates the print queue giving priority to either type of printer driver, which can be appropriately operated.

Next, a second exemplary embodiment of the present invention will be described. Hereinafter, only differences from the first exemplary embodiment will be described. In the server/client type print system, the driver A is installed on both the PC 1 and the PC 10, and the print queue which uses the driver A is generated. Install processing of the driver B, and, print processing of the driver A and the driver B which is related to the install processing of the driver B will be described in detail.

FIG. 9 is a flowchart illustrating install processing of the installer of the driver B in the second exemplary embodiment. This install processing is realized by the CPU 1001 of the PC reading out and executing the installer program which has been computer-readably recorded in the external memory 1011 or the like.

When the install button 52 in FIG. 3 is pressed, the CPU 1001 of the PC (hereinafter, simply the CPU 1001) which executes the installer, installs the driver B. More specifically, the printer driver file of the driver B is stored in the external memory 1011 of the PC.

Next, in step S402, the CPU 1001 searches whether the print queue which uses the driver A is already present on the PC. This processing is similar to that in step S101 in FIG. 4. Next, in step S403, the CPU 1001 determines whether there is the print queue of the printer 20 which uses the driver A. Then, if it is determined that there is not the print queue of the printer 20 which uses the driver A (NO in step S403), the CPU 1001 advances the processing to step S406. In step S406, the CPU 1001 requests the OS to update the print queue of the printer 20, and in step S407, ends the processing. In response to the update request for the print queue, the OS generates the print queue of the printer 20 which uses the driver B.

On the other hand, in step S403, if it is determined that there is the print queue of the printer 20 which uses the driver A (YES in step S403), the CPU 1001 advances the processing to step S404. In step S404, the CPU 1001 acquires a print destination of the print queue of the printer 20. This processing is similar to that in step S301 in FIG. 7. Next, in step S405, the CPU 1001 determines whether the print destination acquired in the above-described step S404 is a remote printer. Then, if it is determined that the print destination is a local printer (not a remote printer) (NO in step S405), the CPU 1001 advances the processing to step S406. In step S406, the CPU 1001 requests the OS to generate the print queue of the printer 20, in step S407, ends the processing. In response to the update request for the print queue, the OS updates the print queue of the printer 20 which uses the driver A to the print queue of the printer 20 which uses the driver B.

On the other hand, if it is determined that the print destination is a remote printer (YES in step S405), in step S407, the CPU 1001 determines that the PC of install destination is a client PC in the server/client type print system, and ends the processing without updating the print queue.

As described above, the installer of the driver B, in a case where the print destination of the print queue which uses the driver A of the printer 20 is a remote printer, performs control to end the install processing of the driver B without making update request for the print queue of the printer 20 to the OS.

If it is determined that the print destination is a remote printer (YES in step S405), a warning screen may be displayed such as the one shown in FIG. 8B from the external memory 1011 of the PC, and the user may select the OK button 82. Thus, the user may be allowed to execute processing for updating the print queue which uses the driver A to the print queue which uses the driver B.

In the install processing of the second exemplary embodiment, shared state of a print queue is not checked. Hence, in a case where the PC of the install destination is working as a server PC, the driver B is installed, and the printer driver which is used for the print queue is updated to the driver B. On the other hand, in a case where the PC of install destination is working as a client PC, the driver B is installed. However, if the print queue which uses the driver A exists already, update of the queue is not performed. Hence, in the client PC, even when the driver B is installed, the driver A instead of the driver B will be continuously used. Update of the print queue in the client PC is performed, after confirming that the driver B is working in the server PC during execution of printing.

Hereinbelow, processing for updating the print queue of the client PC, during the execution of printing from the client PC will be described. FIG. 10 is a flowchart illustrating print processing of the driver B which operates on the server PC. The processing is realized by causing the CPU 1001 of the PC 1 operating as the server to read out and execute a program of the driver B which has been computer-readably recorded (installed) in the external memory 1011 or the like.

In step S600, print processing is started on the PC 1. Then, in step S601, the print processing unit 7 of the driver B in the PC 1 (i.e., the CPU 1001 of the PC 1 which executes the driver B) acquires information of the PC which has created a print job from a job ticket. In the job ticket, various types of information necessary for processing the print job at the time of creating the print job is stored, and is sent to the print processing unit 7 via the job control unit 5 together with the print job. In the present exemplary embodiment, a type of the PC which has created the print job and a type of the driver which has been used for the creation are also stored in the job ticket.

Next, in step S602, the print processing unit 7 of the driver B in the PC 1 determines whether information of the PC which has created the print job, acquired in the above-described step S601 is information of another PC (e.g., the PC 10) working as a client PC. Then, if it is determined that the PC which has created the print job is not another PC working as the client PC (NO instep S602), the print processing unit 7 of the driver B in the PC 1 advances the processing to step S607 and performs normal print processing, and in step S606, ends the processing.

On the other hand, if it is determined that the PC which has created the print job is another PC working as the client PC (YES in step S602), the print processing unit 7 of the driver B in the PC 1 determines it as the print job from another client PC in the server/client type print system, and advances the processing to step S603.

In step S603, the print processing unit 7 of the driver B in the PC 1 acquires subsequently a type of the driver used for creation of the print job from the job ticket. Furthermore, in step S604, the print processing unit 7 of the driver B in the PC 1 determines whether the type of the driver acquired in the above-described step S603 is the driver B. Then, if it is determined that the type of the driver which has been used for creation of the print job is the driver B (YES in step S604), in step S607, the print processing unit 7 of the driver B in the PC 1 performs normal print processing, then in step S606, ends the processing.

On the other hand, if it is determined that the type of the driver which has been used for creation of the print job is the driver A (not the driver B) (NO in step S604), the print processing unit 7 of the driver B in the PC 1 advances the processing to step S605.

In step S605, the print processing unit 7 of the driver B in the PC 1 notifies the OS of the driver mismatch error. This notification is saved in each of the status storage units of the server PC and the client PC by the OS, and is notified to the user as an error (displayed on the display 1010 of the PC 1). Then, in step S606, the print processing unit 7 of the driver B in the PC 1 ends the processing without performing print processing.

Through the above configuration, in the server/client print system, in a case where the print job from the client PC is implemented from a driver different from the driver of the server PC, the server PC detects a mismatch with the type of the driver of itself and notifies the mismatch as an error.

Figure 11:
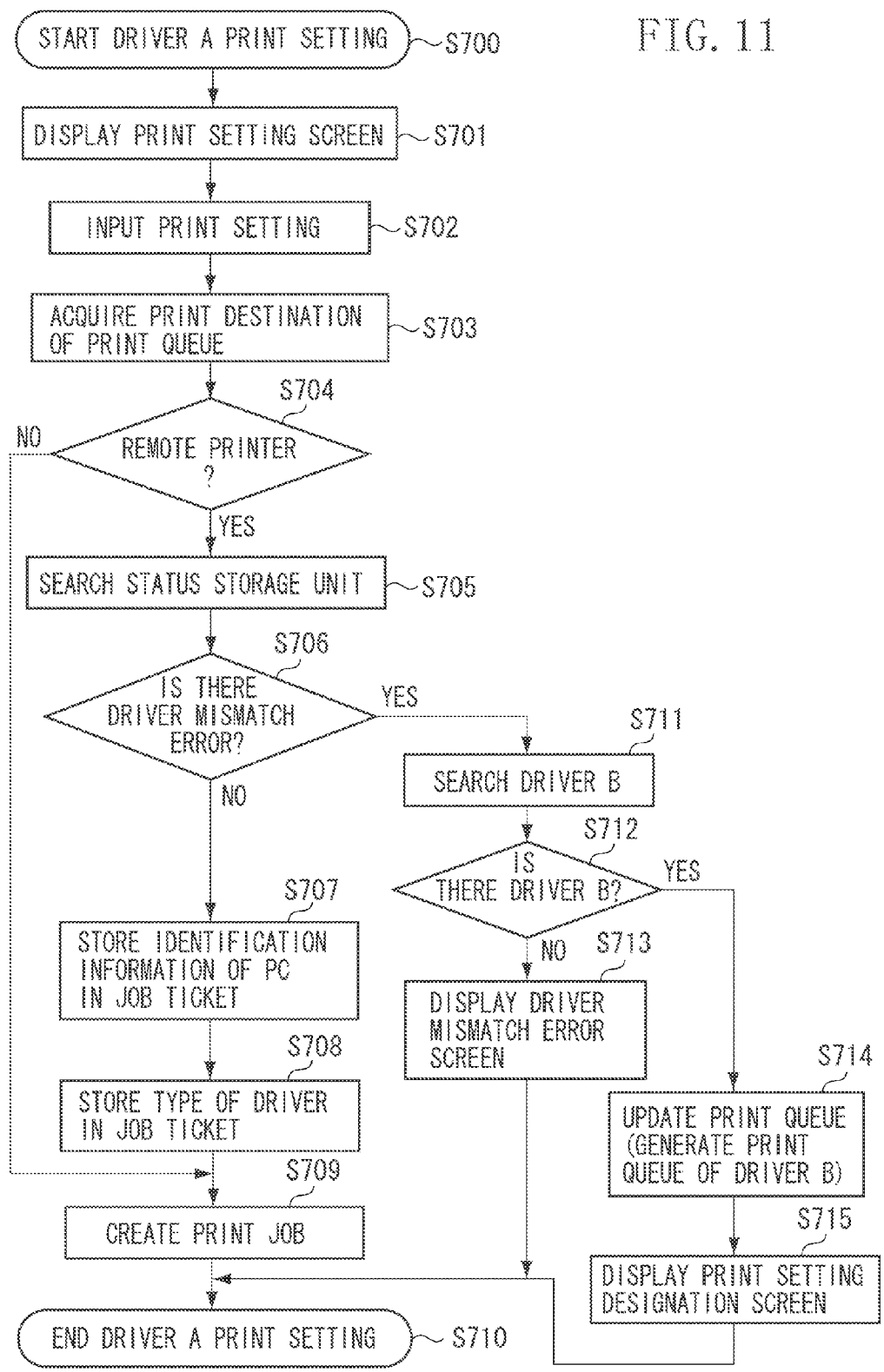
FIG. 11 is a flowchart illustrating update processing of a print queue at the time of print setting of a driver which is operated on a client PC.

Next, operation of the driver of the client PC will be described. FIG. 11 is a flowchart illustrating update processing of the print queue at the time of print setting of the driver A which operates on the client PC. The processing is realized by causing the CPU 1001 of the PC 10 operating as the client to read and execute a program of the driver A which has been computer-readably recorded (installed) in the external memory 1011 or the like.

When setting of printing using the printer 20 by the PC 10 is started, in step S701, the print setting unit 2 of the driver A in the PC 10 (i.e., the CPU 1001 of the PC 10 which executes the driver A) displays the print setting input screen (print dialog) on the display 1010 of the PC 10. Then, in step S702, the print setting unit 2 of the driver A in the PC 10 accepts input of various types of print setting values from the user.

Next, when the user inputs various print setting values to perform operation for making a request for printing (when the user clicks a "print" button on the print dialog), in step S703, the print setting unit 2 of the driver A in the PC 10 acquires a print destination of the print queue of the printer 20. In this case, the print setting unit 2 refers to the PPD file, to acquire information of whether the print destination of the print queue of the printer 20 is a local printer or a remote printer.

Next, in step S704, the print setting unit 2 of the driver A in the PC 10 determines whether the print destination acquired in the above-described step S703 is a remote printer. Then, if it is determined that the print destination is a local printer (not a remote printer) (NO in step S704), the print setting unit 2 of the driver A in the PC 10 advances the processing to step S709.

In step S709, the print setting unit 2 of the driver A in the PC 10 returns a control to the OS to issue (create) the print job. The OS delivers the control to the application 4, and the application 4 creates a print job which includes a job ticket storing various print setting information and print data, and sends the print job to the job control unit 5. Upon completion of the above-described step S709, in step S710, the print setting unit 2 of the driver A ends print setting processing.

On the other hand, if it is determined that the print destination is a remote printer (YES in step S704), the print setting unit 2 of the driver A in the PC 10 advances the processing to step S705. In step S705, the print setting unit 2 of the driver A in the PC 10 refers to the status storage unit 3 in the PC 10, then in step S706, checks whether the driver mismatch error has been notified from the server PC. Then, if it is determined that the driver mismatch error has not been notified (NO in step S706), the print setting unit 2 of the driver A in the PC 10 advances the processing to step S707.

In step S707, the print setting unit 2 of the driver A in the PC 10 stores identification information of the PC 10 in the job ticket which the application 4 of the PC 10 has generated, then in step S708, stores a type of the driver (the driver A) in the above-described job ticket. Furthermore, in step S709, the print setting unit 2 of the driver A returns a control to the OS to issue (create) the print job. The OS delivers the control to the application 4, and the application 4 creates a print job which contains the above-described job ticket and print data, and sends the print job to the job control unit 5. Upon completion of processing in the above-described step S709, in step S710, the print setting unit 2 of the driver A ends the print setting processing.

On the other hand, if it is determined that the driver mismatch error is notified (YES in step S706), the print setting unit 2 of the driver A in the PC 10 advances the processing to step S711. In step S711, the print setting unit 2 of the driver A in the PC 10 searches whether the driver B is installed, then in step S712, determines whether the driver B has been installed. In other words, it is determined whether the printer driver file of the driver B is stored in the external memory 1011 of the PC 10. Then, if it is determined that the driver B has been installed (YES in step S712), the print setting unit 2 of the driver A in the PC 10 advances the processing to step S714.

In step S714, the print setting unit 2 of the driver A in the PC 10 requests the OS to generate a print queue of the printer 20, then in step S710, ends the processing. In response to the update request for the print queue, the OS of the PC 10 updates the print queue of the printer 20 which uses the driver A to the print queue of the printer 20 which uses the driver B.

Figure 12A:
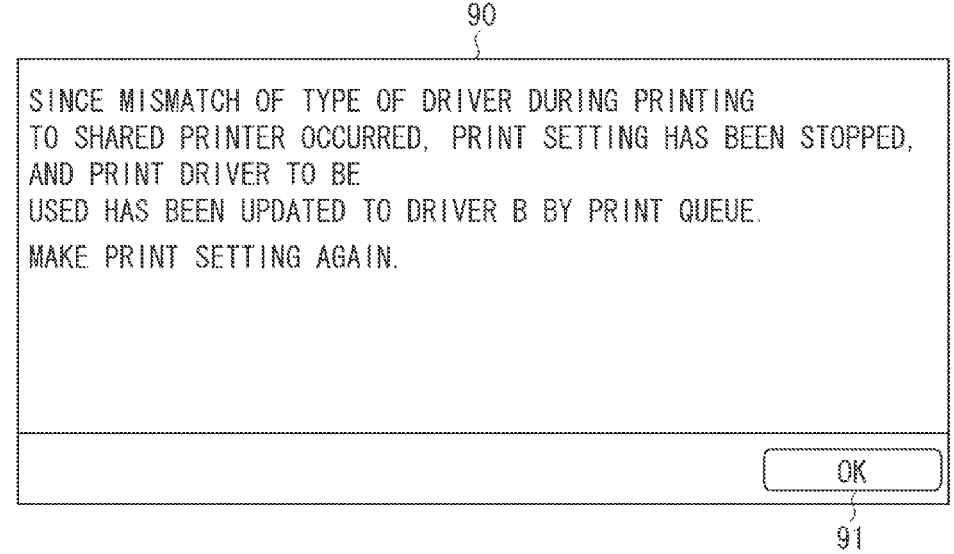
FIGS. 12A and 12B illustrate an example of print resetting instruction screen, and a driver mismatch error screen.

Next, in step S715, the print setting unit 2 of the driver A in the PC 10 displays the print resetting instruction screen 90 illustrated in FIG. 12A on the display 1010 of the PC 10. FIG. 12A illustrates an example of the print resetting instruction screen 90. Then, when an OK button 91 is pressed on the print resetting instruction screen 90, the print setting unit 2 of the driver A in the PC 10 closes the screen 90, and in step S710, ends print setting processing without creating a print job. After the processing in the above-described step S715 is performed, when the user starts print setting of the printer 20 on the PC 10, print setting processing will be performed by the print setting unit 2 of the driver B in the PC 10.

Figure 12B:
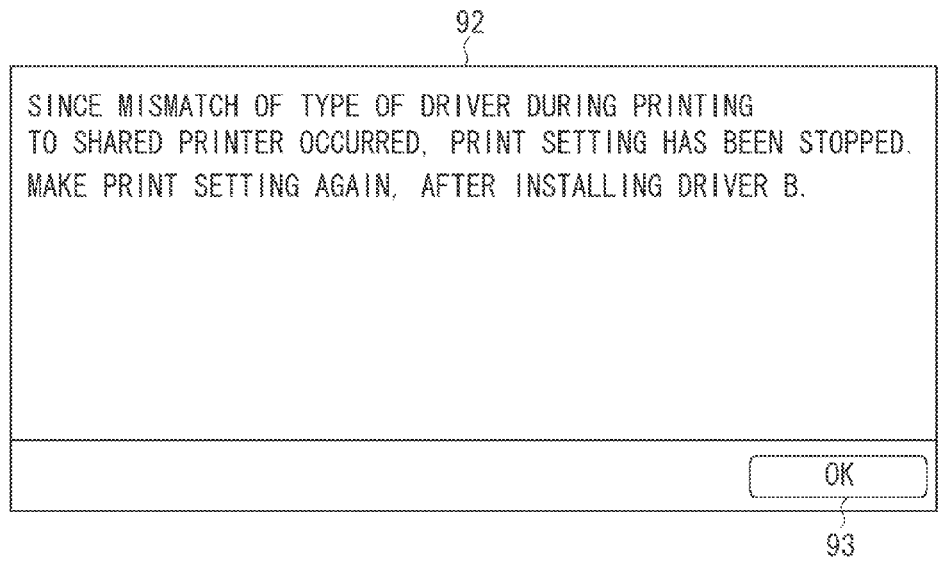

On the other hand, if it is determined that the driver B has not been installed (NO in step S712), the print setting unit 2 of the driver A in the PC 10 advances the processing to step S713. In step S713, the print setting unit 2 of the driver A in the PC 10 displays a driver mismatch error screen 92 illustrated in FIG. 12B on the display 1010 in the PC 10. FIG. 12B illustrates an example of the driver mismatch error screen 92. Then, when an OK button 93 is pressed on the driver mismatch error screen 92, the print setting unit 2 of the driver A in the PC 10 closes the screen 92, then in step S710, ends print setting processing without creating a print job.

As described above, the client PC 10 has a configuration such that, when the driver A is processing the print job, it is determined whether output destination of the print queue which uses the driver A is a remote printer. Then if it is determined as a remote printer, further it is determined whether there is a history of having received an error notification from the server the PC 1. Then if it is determined that there is the history of having received the error notification, further it is determined whether the driver B has been already installed on the PC 10. Then if the driver B is determined as already installed, processing for requesting the OS to update the print queue of the printer 20 is executed. Thus, in the server/client type print system, in a case where the driver which works on the client PC 10, during the job processing, is a driver different (incompatible) from the driver which is operative on the server PC, the driver which works on the client PC 10 can be updated to the same type (incompatible) of driver.

As described above, in the print system according to the second exemplary embodiment, when the client driver detects that a type of the driver which is operative on the server is different, the print queue can be updated so that a driver of the same type as that of the server is operative.

In the exemplary embodiment of the present invention, the driver A operable on the OS of the MacOS X10.4 or before and the driver B operable on the OS of the MacOS X10.6 or later are taken as examples of different types of printer drivers, but are not limited to these.

For example, in a case where a print queue of the printing apparatus is updated, while plural types of printer drivers which correspond to the same printing apparatus are installed, the present invention is applicable as long as the operating system updates the print queue giving priority to either printer driver.

If the above-described plural types of printer drivers are different types of printer drivers from each other, coming from difference of print setting methods of printer drivers, difference of processable data formats, or difference of configurations of program files, or the like, the present invention is applicable.

Furthermore, structures of various data and their contents are not limited to the above-described ones, but they can be constituted by various structures or contents, depending on uses and purposes. Although only one exemplary embodiment has been illustrated, the present invention can take embodiments as, for example, a system, an apparatus, a method, a program or a recording medium. More specifically, the present invention may be applied to a system including a plurality of devices, or may be applied to an apparatus including a single device. Further, configurations combining the above-described exemplary embodiments are all included in the present invention.

Other Embodiments

Further, the present invention is also realized by executing the following processing. That is, software (program) is supplied which implements the functions of the above-described exemplary embodiments to a system or an apparatus via a network or various types of recording media, and a computer (or a CPU or a microprocessing unit (MPU) and/or the like) of the system or apparatus reads out and executes the program.

Further, The present invention is not limited to the above-described exemplary embodiments, but various modifications (including organic combinations of respective exemplary embodiments) are possible based on the spirit of the present invention, and they are not to be excluded from the scope of the present invention. In other words, configurations combining the above-described exemplary embodiments and their modified examples are all included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-023490 filed Feb. 7, 2011, which is hereby incorporated by reference herein in its entirety.

What is claimed is:

1. An information processing apparatus on which an operating system runs, wherein the operating system, in a case where a print queue of a printing apparatus is updated while plural types of printer drivers corresponding to the printing apparatus are installed, updates the print queue giving priority to either type of printer driver, the information processing apparatus comprising:
a search unit configured to search an existing print queue corresponding to a printer controlled by an install target printer driver, in install processing of the printer driver;
a determination unit configured to determine whether an output destination of the print queue searched by the search unit is a printing apparatus connected via another apparatus; and
a control unit configured, if it is determined that the output destination of the print queue is the printing apparatus connected via another apparatus by the determination unit, to perform control to end the install processing without making an update request for the print queue to the operating system.

2. The information processing apparatus according to claim 1, wherein the search unit searches a print queue which is the existing print queue and uses a type of printer driver incompatible with the install target printer driver.

3. The information processing apparatus according to claim 2, wherein, when a printer driver of a type incompatible with a print driver which is given priority by the operating system among the plural types of printer drivers, processes a print job, if it is determined that the output destination of print queue using the print driver of the incompatible type, is a printing apparatus connected via another apparatus, and there is a history of having received error notification from the another apparatus, and the print driver of the type which is given priority has been already installed in the information processing apparatus, a request for causing the operating system to perform update of the print queue is made.

4. The information processing apparatus according to claim 1, further comprising:
a warning unit configured, if it is determined that the output destination of the print queue is a printing apparatus connected via another apparatus by the determination unit, to make a warning that printing cannot be correctly performed using the print queue when the install processing is continued.

5. The information processing apparatus according to claim 4, further comprising:
an instruction unit configured to instruct continuation of the install processing even in a case where warning has been made by the warning unit,
wherein, when the instruction unit is given by a user, the control unit continues the install processing to make update request for the print queue to the operating system.

6. An information processing apparatus on which an operating system runs, wherein the operating system, in a case where a print queue of a printing apparatus is updated while plural types of printer drivers corresponding to the printing apparatus are installed, updates the print queue giving priority to either type of printer driver, the information processing apparatus comprising:
- a search unit configured to search an existing print queue corresponding to a printer controlled by an install target printer driver, in an install processing of a printer driver;
- a determination unit configured to determine whether the print queue searched by the search unit is operating in a shared state with another apparatus; and
- a control unit configured, if it is determined that the print queue is operating in a shared state with another apparatus by the determination unit, to perform control to end the install processing without making an update request for the print queue to the operating system.

7. The information processing apparatus according to claim 6, wherein the determination unit acquires information of an apparatus which has generated a print job processed according to the print queue, from within a spool file generated during the past printing, and determines that the print queue is operating in a shared state with another apparatus, if another apparatus is included in the acquired information.

8. The information processing apparatus according to claim 7, further comprising:
- a warning unit configured, if it is determined that the print queue is operating in a shared state with another apparatus by the determination unit, to warn that the print queue cannot be correctly printed, when the install processing is continued.

9. The information processing apparatus according to claim 6, wherein the search unit searches a print queue which is the existing print queue, and uses a printer driver of a type incompatible with the install target printer driver.

10. A control method in an information processing apparatus on which an operating system runs, wherein the operating system, in a case where a print queue of a printing apparatus is updated while plural types of printer drivers corresponding to the printing apparatus are installed, updates the print queue giving priority to either type of printer driver, the control method executes:
- searching an existing print queue corresponding to a printer controlled by an install target printer driver, in install processing of a printer driver;
- determining whether an output destination of the print queue searched by the search unit is a printing apparatus connected via another apparatus; and
- if it is determined that the output destination of the print queue is the printing apparatus connected via another apparatus by the determination unit, performing control to end the install processing without making an update request for the print queue to the operating system.

11. A control method in an information processing apparatus on which an operating system runs, wherein the operating system, in a case where a print queue of a printing apparatus is updated while plural types of printer drivers corresponding to the same printing apparatus are installed, updates the print queue giving priority to either type of printer driver, the control method executes:
- searching an existing print queue corresponding to a printer controlled by an install target printer driver in install processing of a printer driver;
- determining whether the print queue searched by the search unit is operating in a shared state with another apparatus; and
- if it is determined that the print queue is operating in a shared state with another apparatus by the determination unit, performing control to end the install processing without making an update request for the print queue to the operating system.

12. A non-transitory computer readable storage medium on which is stored a computer program for making a computer execute a method for an information processing apparatus on which an operating system runs, wherein the operating system, in a case where a print queue of a printing apparatus is updated while plural types of printer drivers corresponding to the same printing apparatus are installed, updates the print queue giving priority to either type of printer driver, the method comprising:
- searching an existing print queue corresponding to a printer controlled by an install target printer driver, in install processing of a printer driver;
- determining whether an output destination of the print queue searched by the search unit is a printing apparatus connected via another apparatus; and
- if it is determined that the output destination of the print queue is the printing apparatus connected via another apparatus by the determination unit, performing control to end the install processing without making an update request for the print queue to the operating system.

13. A non-transitory computer readable storage medium on which is stored a computer program for making a computer execute a method for an information processing apparatus on which an operating system runs, wherein the operating system, in a case where a print queue of a printing apparatus is updated while plural types of printer drivers corresponding to the same printing apparatus are installed, updates the print queue giving priority to either type of printer driver, the method comprising:
- searching an existing print queue corresponding to a printer controlled by an install target printer driver, in an install processing of a printer driver;
- determining whether the print queue searched by the search unit is working in a shared state with another apparatus; and
- if it is determined the print queue is operating in a shared state with another apparatus by the determination unit, performing control to end the install processing without performing an update request for the print queue to the operating system.

* * * * *